Figure 2:
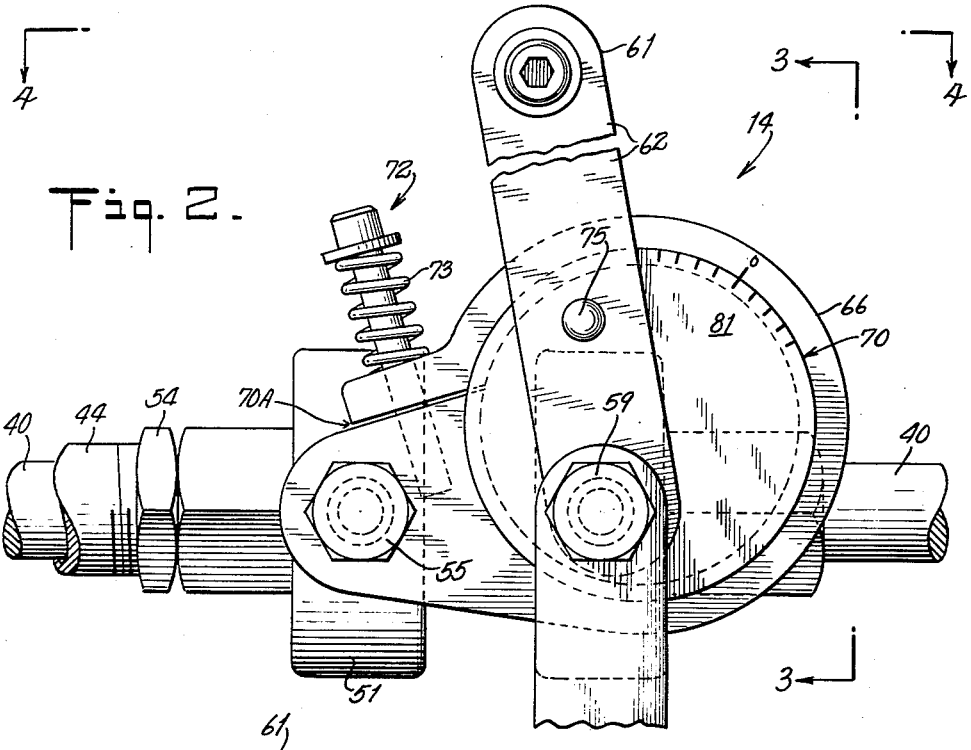

June 7, 1960
W. E. BECKJORD
2,939,334
HAND OPERATED ACTUATOR FOR A DRIVE SHAFT TO
CHANGE THE PITCH OF A REVERSIBLE
BLADE PROPELLER
Filed Oct. 27, 1953
3 Sheets-Sheet 1
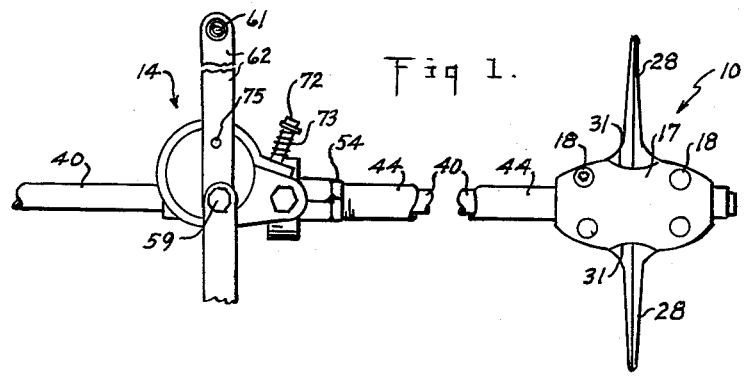
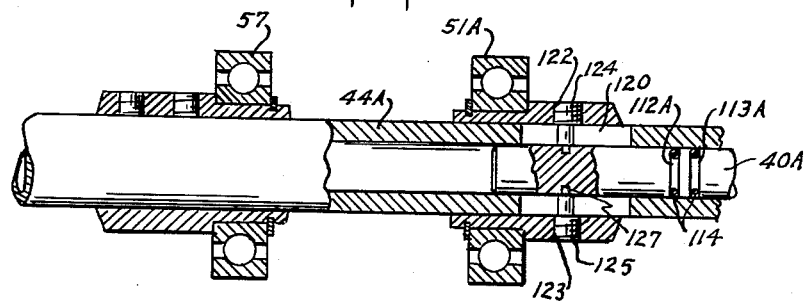
INVENTOR.
WILLIAM EDWARD BECKJORD
BY
Howard J. Jeandron
ATTORNEY June 7, 1960

W. E. BECKJORD 2,939,334

HAND OPERATED ACTUATOR FOR A DRIVE SHAFT TO
CHANGE THE PITCH OF A REVERSIBLE
BLADE PROPELLER

Filed Oct. 27, 1953

3 Sheets-Sheet 2

INVENTOR.
WILLIAM EDWARD BECKJORD
BY
Howard J. Jeandron
ATTORNEY

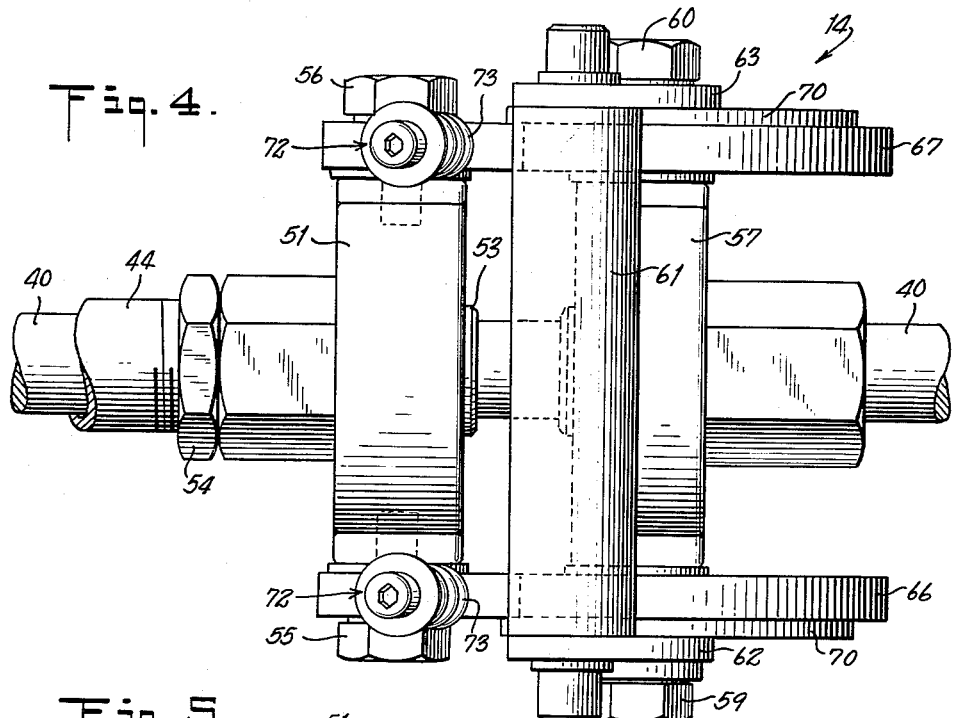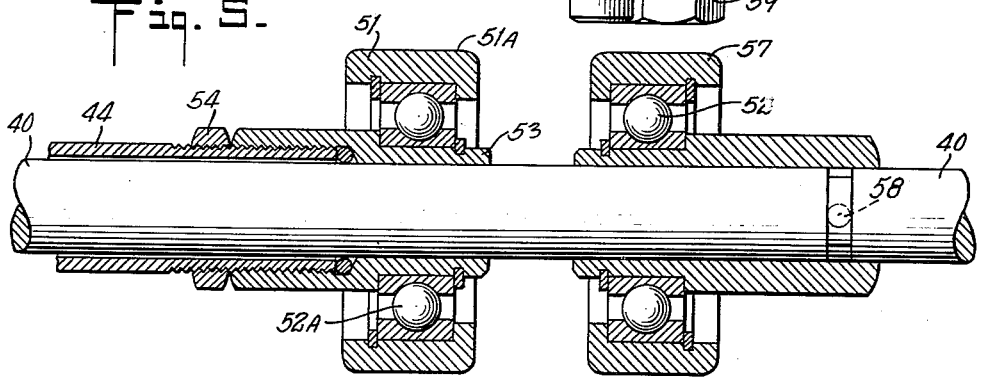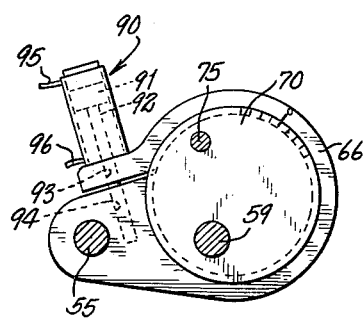

United States Patent Office 2,939,334
Patented June 7, 1960

2,939,334

HAND OPERATED ACTUATOR FOR A DRIVE SHAFT TO CHANGE THE PITCH OF A REVERSIBLE BLADE PROPELLER

William E. Beckjord, 242 Swan Blvd., Toms River, N.J.

Filed Oct. 27, 1953, Ser. No. 388,649

9 Claims. (Cl. 74—491)

This invention relates to propellers and more particularly to the means for changing the pitch of the blades of a propeller. In the prior art there are a plurality of devices providing for the reversing or changing the pitch of the blade of a propeller whether it be for a boat or an airplane or a mixing device. Most of the devices depend upon a drive shaft for the propeller and provide oppositely mounted blades pivotally attached with a control pin or cam that may be moved on the longitudinal axis of the shaft to pivotally move the oppositely positioned blades and in turn change their pitch, the control or movement being sufficient to move the blade from a forward drive pitch to a reverse drive pitch. The means of moving the blades from one pitch to another illustrated in the prior art is by a simple hand lever that in turn moves the main drive shaft or by a lever connected to a sleeve that is fitted about the drive shaft. The prior art also illustrates a device in which the pitch controlling mechanism is driven by a worm gear and the worm gear in turn is driven by an external gear that may be attached to any external drive means. Various modifications of the blade mounting may be found in the prior art but in each and every instance the blade is pivotally mounted to a housing through which a shaft or sleeve is fitted and the blade is connected to the slideable shaft or sleeve to permit a direct thrust in shifting the position of the blades with relation to each other. A further disclosure in the prior art illustrates a link connection to the base of each propeller blade. The movement of the links by a thrust collar permits the changing of the pitch of the blades. A still further disclosure in the prior art provides for a rack and pinion connection to the base of each blade so that the longitudinal movement of the rack will in turn rotate the blade to the desired pitch. A still further disclosure in the prior art provides for a sliding block mounted in a hollow hub with radially disposed blades in which the pitch of the blades is controlled by the sliding block. A longitudinally shiftable sleeve is provided to produce the change in pitch of the blades. And, of course the prior art includes aircraft propellers that are mechanically moved by a gearing arrangement to change the pitch of the prop or are electrically driven to change the pitch of the prop or are hydraulically forced by a piston arrangement to vary the pitch of the prop. Applicant's device is somewhat similar to the prior art in the mounting of the propeller blade. However, applicant's propeller blades are concentrically positioned with relation to a hub structure and to each other and instead of being pivotally positioned they are rotated within the concentric bearing by means of an offset member, the offset member in turn being slideably connected to a sleeve so that the movement of the sleeve in a longitudinal direction with relation to the drive shaft will affect the change of pitch of the blade. Likewise applicant provides a simplified hand control for the shifting of the pitch of the prop that simply and positively provides a thrust of the sleeve element in either direction with no loss of pitch control due to looseness, etc.

In most of the prior art the devices are cumbersome, complicated, or costly to manufacture or do not lend themselves to the high speed operation of present day application.

It is an object of this invention to provide a hand operated actuator for a drive shaft to change the pitch of a reversible blade propeller that is controlled by the longitudinal movement of a sleeve element connected to said blades in which the sleeve element is in turn connected to a cam operated by a lever actuator which permits the positioning of the reversible blades of the propeller by a simple thrust forward or reverse of the lever actuator.

A still further object of this invention is to provide a pair of thrust collars on a drive shaft in which one collar is positioned in a stationary position with relation to the shaft while the other collar is slideable in either direction on said shaft and on which a pair of hand operated cams are pivotally attached to said first collar and are provided to control the movement of the second thrust collar in its longitudinal position on said shaft.

A still further object of this invention is to provide a hand operated actuator for a drive shaft to change the pitch of a reversible blade propeller in which a pair of blades are mounted in an opposed relation on a drive shaft and concentric to each other with offset members to permit a sleeve attached to said members to be moved longitudinally to position said blades and in which a pair of thrust collars are provided on the drive shaft in which one collar is positioned in a stationary position with relation to the shaft while the other collar is affixed to the slideable sleeve to move in either direction on said shaft and in which a pair of hand operated cams are pivotally attached to said first collar and are provided to control the movement of the second thrust collar in its longitudinal position on said shaft.

A still further object of this invention is to provide a hand operated actuator for a drive shaft to change the pitch of a reversible blade propeller in which a plurality of blades are mounted in equal spaced relationship on a drive shaft and concentric to each other with offset members to permit a sleeve attached to said members to be moved longitudinally to position said blades and in which a pair of thrust collars are provided on the drive shaft in which one collar is positioned in a stationary position with relation to the shaft while the collar is affixed to the slideable sleeve to move in either direction on said shaft and in which a pair of hand operated cams are pivotally attached to said first collar and are provided to control the movement of the second thrust collar in its longitudinal position on said shaft.

A still further object of this invention is to provide a hand operated actuator for a drive shaft to change the pitch of a reversible blade propeller in which a plurality of pairs of blades are mounted each in an opposed relation on a drive shaft and concentric to each other with offset members to permit a sleeve attached to said members to be moved longitudinally to position said blades and in which a pair of thrust collars are provided on the drive shaft in which one collar is positioned in a stationary position with relation to the shaft while the other collar is affixed to the slideable sleeve to move in either direction on said shaft and in which a pair of hand operated cams are pivotally attached to said first collar and are provided to control the movement of the second thrust collar in its longitudinal position on said shaft.

Figure 3:
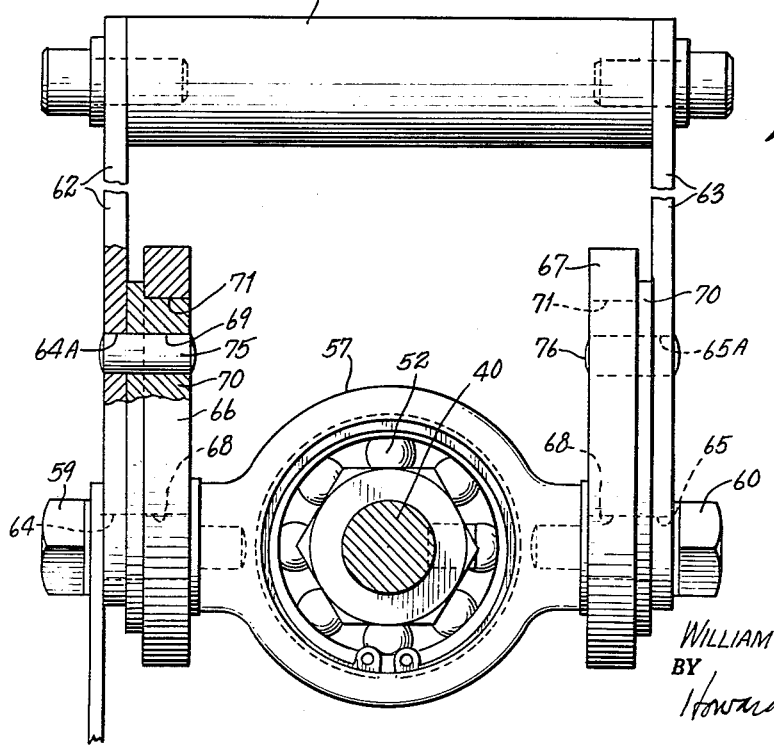

Other objects of this invention may be apparent by reference to the accompanying detailed desription and the drawings in which Fig. 1 is a composite view of the reversible propeller and hand operated control, Fig. 2 is a side elevational view of the hand operated control for the reversible propeller, Fig. 3 is an elevational view partly in cross section taken on line 3—3 of Fig. 2, Fig. 4 is a plan view taken on line 4—4 of Fig. 2, Fig. 5 is a cross sectional view of the thrust collar arrangement with the hand control removed, Fig. 6 is a schematic illustration of a hydraulic lock for the control mechanism, Fig. 7 is a still further embodiment illustrating a cross sectional view of the thrust collar arrangement with the hand control removed.

Referring to Fig. 1 there is illustrated a reversible propeller mechanism 10 connected by a drive shaft 40 and pitch controlling sleeve 44 to a control mechanism 14 which is in turn connected to the drive shaft 40. The drive shaft 40 is connected to a motor (not shown).

Referring to Figs. 2 through 5 there is illustrated a hand operated actuator 14 for the reversible propeller. Drive shaft 40, which is also the actuating rod, passes through the actuator 14 while sleeve 44 is secured to a bearing housing or collar 51. Collar 51 is comprised of an outer housing 51A with a thrust bearing 52A mounted within the housing and supported on a tube nut 53. The tube nut 53 is threadably secured to sleeve 44 and is locked in this position by a lock-nut 54. The sleeve, tube nut, and shaft rotate together in the bearing; the housing 51 does not rotate. The collar 51 is provided with a pair of shoulder bolts 55 and 56 mounted in opposed relation on either side of collar 51. Collar 51 is thus the moveable collar, that is, longitudinally moveable to position sleeve 44 at any one of the predetermined positions already described. A collar 57 of the same general construction as collar 51 is mounted to be longitudinally stationary about the rotating shaft 40 and the shaft lock 58. Collar 57 is also provided with a thrust bearing 52 and a pair of opposed shoulder bolts 59 and 60. A pair of circular cam discs 66 and 67 are pivotally mounted on the shoulder bolts 59 and 60 through the apertures 68 of the cam discs 66 and 67. Thus the cam discs are eccentrically mounted. A pair of cam shoes 70 are pivotally mounted on the cam discs 66 and 67 through the apertures 71 and also pivotally mounted on the shoulder bolts 55 and 56 through the apertures 71 in the cam shoes. A pair of lever arms 62 and 63 are attached to the cam discs 66 and 67 in fixed relationship through the apertures 64, 65, 64A and 65A by the pins 75 and 76 and the shoulder bolts 59 and 60. The other end of the arms 62 and 63 are joined by the handle 61 so that the arms 62 and 63 and the discs 66 and 67 and the apertures 68 and 65 pivot about a common axis in unison when the handle 61 is moved in a longitudinal direction. Each shoe 70 is provided with a tensioning device 72 in the form of a threaded bolt passing through the split portion 70A of the shoe 70 and with a compression spring 73 mounted between the head of bolt 72 and the holding shoe 70. Thus, by increasing the compression of spring 73, the shoe 70 may be forced together into a tighter relationship with the circumference of cam 66 around which it is mounted. Cam 66 may thus be retained by shoe 70 and by adjusting element 72 the degree of friction that may be desired may readily be adjusted. One feature of particular interest in the design of the pitch control is the fact that when the pitch and cam are in the forward position of about 25° at the extreme forward pitch, the unit is virtually self-locking without the friction element within a certain range about the forward position. At a full ahead position, the discs 66 and 67 will be pivotally rotated by the handle 61 to a position where the center of the discs is in horizontal alignment with the pivotal pin. Consequently there can be no longitudinal movement of the shoe 70 and the disc 66 by virtue of a natural lock. As the handle is moved upward to in turn move discs 66 and 67 to a position where the central axis of the discs will be approximately 25° above the pivotal axis, the possible rotative thrust on discs 66 and 67 is still very small, consequently there is still a strong natural lock. Since cams 66 and 67 are rotatably positioned in the holding shoes 70, any rotation of the cams 66 and 67 by moving handle 61 will provide a thrust movement through the shoes 70 to the pivotal pins 55 and 56 and in turn move the collar 50 in the direction of the thrust. The force applied to handle 61 is greatly multiplied not only by the fulcrum arm length of the handle 61 from the pivotal pins 59 and 60 but in addition the offset distance of the arm with relation to the center of cams 66 and 67 and in turn the thrust of cams 66 and 67 toward the pivotal pins 55 and 56 of collar 50. It is apparent that by means of this mechanical combination of fulcrum arm and cam that a greatly increased power shift of sleeve 44 is provided yet the friction of the holding shoes 70 may be adjusted to retain the control handle in any position and simultaneously the friction of the shoe may be increased or decreased to provide the desired feel for the operator. The shaft 40 would rotate in the bearings 52 the same as the shaft and tube assembly will rotate in the bearings 52A. Consequently the stationary support 80 is provided to keep the pitch control handle in a vertical or horizontal position as desired. It is apparent that collar 57 becomes a thrust collar to permit the mechanical movement described to induce a forward or reverse thrust through collar 51 to the sleeve 44 and as already described through sleeve 44 to the blades 28 to change their position with relation to the hub structure 16. Referring to Fig. 2 it is apparent that either a dial or the face 81 of the shoe 70 may be marked as indicated to determine the position of handle 61 as already described. That is, handle 61 may be moved to the position marked, that is, full feathered no-drag position 82, full reverse 83, neutral 84 and full forward drive 85 or any intermediate position and will be retained in the position set. One of the important features in the overall design of this unit is that by a simple hand lever control of the pivoting part, a "no-play" or "loss of pitch" construction can be easily attained in production which assures no "slap" or undesirable looseness in the pitch control.

In a further embodiment of this invention illustrated in Fig. 6 there is provided a hydraulic cylinder 90 which will replace the spring 73 and bolt 72 of Fig. 6. Thus the hydraulic cylinder 90 is affixed to the shoe 70. The cylinder 90 is provided with a piston 91 and a piston rod 92. The piston rod 92 passes through an aperture 93 in the upper portion of shoe 70 and may be threadably secured in a bore 94 in the lower portion of shoe 70. The hydraulic cylinder 90 is provided with two fluid lines 95 and 96 which are in turn connected to a hydraulic system (not shown). It is apparent in operation that the hydraulic system may be utilized to move piston 91 in either direction. Thus with the piston rod 92 affixed to the lower portion of shoe 70 and the cylinder 90 affixed to the upper portion of shoe 70, movement of piston 91 downward (Fig. 6) opens the split portion 70A while movement of piston 91 upward will have the opposite effect of closing the split portion 70A and thus producing an increased friction on cam 66. Thus with the embodiment illustrated in Fig. 6 the hydraulic control provides a positive locking pressure on cam 66 when desired.

The end of the actuating rod 40A (Fig. 7) is connected to a thrust collar 51A. The other thrust collar 57 shown is similar in construction and in manner of attachment to that illustrated in Fig. 9 except that the shaft extending through thrust collar 57 is a hollow tube 44A. In this embodiment the hollow shaft 44A is provided with a pair of opposed longitudinal slots 120 and 121 that must be positioned to fit within the thrust collar 51A. The thrust collar 51A is provided with a pair of opposed threaded bores 122 and 123 and a pair of dog point set screws 124 and 125 are provided to be fitted into the threaded bores 122 and 123. The set screws 124 and 125 will extend through the opposed slots 120 and 121 and the dog point of the set screw will fit into a pair of cup shaped formations 126 and 127 in the actuating rod 40A, the dog points fitting snugly and securely in the cup shaped portions 126 and 127. The actuator rod 40A is also provided with a pair of grooves 112A and 113A into which O ring seals 114 are inserted similar to those in the opposite end of the rod 40A. Thus it is apparent with this construction that collar 51A may be moved longitudinally on the hollow shaft 44A, the limitations of the movement of collar 51A being provided by either end of slots 120 and 121 due to the set screws projecting therethrough. It is also apparent that any longitudinal movement of the thrust collar 51A will necessarily move the actuating rod 40A with the same degree of longitudinal movement. It is further apparent that with a hand control device as illustrated in Figs. 2, 3, and 4 that the movement of thrust collar 51A may be controlled in its longitudinal movement. It will in turn be apparent that by means of the hollow shaft 44A and actuating rod 40A control mechanism will provide the necessary control of the blades 28 of the hub structure 16A to in turn position blades 28 in any of their relative positions.

Although applicant has described the hand operated actuator for a drive shaft to change the pitch of a reversible blade propeller mechanism and its control mechanism, it is apparent that the handle 61 may be replaced with a mechanical connection tot permit remote control of the complete mechanism or any other means of rotating cams 66 and 67 may be provided. Likewise although there is illustrated a friction control brake shoe for cam 66 there may be provided a simple spring actuated locking device or hydraulic locking device or any other means without departing from the spirit of this invention, and this invention shall be limited only by the appended claims.

What is claimed is:

1. In a hand operated actuator which includes a hollow drive shaft and actuating rod, said actuating rod slideable with relation to said hollow drive shaft and moveable in a longitudinal direction by means of said hand operated actuator, said hand operated actuator comprised of a pair of spaced thrust collars that are connected by means of a pivotally supported brake shoe and eccentrically mounted cam disc, said eccentrically mounted cam disc supported within said brake shoe, one thrust collar affixed to a stationary element and the eccentrically mounted cam disc and the other collar affixed to said hollow drive shaft and the brake shoe that supports said eccentrically mounted cam disc, a handle connected to said eccentrically mounted cam disc to rotate said cam disc to a plurality of predetermined positions, means to move said handle to a predetermined position to in turn produce a predetermined degree of movement between said actuating rod and said hollow drive shaft.

2. In a device according to claim 1 in which a resilient element is mounted to said brake shoe to provide a frictional grip on said eccentrically mounted cam disc.

3. In a hand operated actuator which includes a hollow drive shaft and actuating rod, said actuating rod slideable with relation to said hollow drive shaft and moveable in a longitudinal direction by means of said hand operated actuator, said hand operated actuator comprised of a pair of spaced thrust collars that are connected by means of a pair of pivotally supported brake shoes and a pair of eccentrically mounted cam discs, said pair of eccentrically mounted cam discs each supported in a brake shoe, one thrust collar affixed to a stationary element and providing the pivotal mounting for said pair of eccentrically mounted cam discs and the other collar affixed to said hollow drive shaft and providing the pivotal mounting for said pair of brake shoes that supports said pair of eccentrically mounted cam discs, a handle connected to both eccentrically mounted cam discs to rotate said cam discs to a plurality of predetermined positions, means to move said handle to a predetermined position to in turn move said drive shaft a predetermined degree with relation to said actuating rod.

4. In a device according to claim 3 in which a pair of resilient elements are mounted to said brake shoes to provide a frictional grip on said eccentrically mounted cam discs.

5. In a device according to claim 3 in which a pair of hydraulic cylinders are mounted each to a brake shoe to provide a locking grip on said eccentrically mounted cam discs.

6. In a hand operated actuator which includes a hollow drive shaft and actuating rod, said actuating rod slideable with relation to said hollow drive shaft and moveable in a longitudinal direction by means of said hand operated actuator, said hand operated actuator comprised of a pair of spaced thrust collars that are connected by means of a pair of pivotally supported brake shoes and a pair of eccentrically mounted cam discs, said pair of eccentrically mounted cam discs each supported in a brake shoe, one thrust collar affixed to a stationary element and providing the pivotal mounting for said pair of eccentrically mounted cam discs and the other collar affixed to said sleeve and providing the pivotal mounting for said pair of brake shoes that supports said pair of eccentrically mounted cam discs, a pair of adjustable resilient elements mounted to said brake shoes to provide a frictional grip on said eccentrically mounted cam discs, a handle connected to both eccentrically mounted cam discs to rotate said cam discs from a forward position to a reverse position, said handle being self-locking in a range about the forward position, means to frictionally lock said handle in any other position between the forward and reverse positions.

7. In a device according to claim 6 in which the eccentrically mounted cam discs are rotatable from a forward position through a neutral and reverse position to a fully extended position.

8. In a hand operated actuator which includes a hollow drive shaft and an actuating rod mounted within said hollow drive shaft, said hollow drive shaft and actuating rod connected to a device to be actuated, said actuating rod slideable with relation to said hollow drive shaft and movable in a longitudinal direction by means of said hand operated actuator, said device connected to said actuating rod to be moved by the longitudinal movement of said rod, said hand operated actuator comprised of a pair of spaced thrust collars that are connected by means of a pivotally supported brake shoe and eccentrically mounted cam disc, said eccentrically mounted cam disc supported within said brake shoe, one thrust collar affixed to a stationary element and the eccentrically mounted cam disc and the other collar affixed to said hollow drive shaft and the brake shoe that supports said eccentrically mounted cam disc, a handle connected to said eccentrically mounted cam disc to rotate said cam disc to a plurality of predetermined positions, means to move said handle to a predetermined position to in turn actuate said device to a predetermined degree.

9. In a hand operated actuator which includes a hollow drive shaft and an actuating rod mounted within said hollow drive shaft, said hollow drive shaft and actuating rod connected to a device to be actuated and the hand operated control, said rod slideable with relation to said hollow drive shaft and moveable in a longitudinal direction by means of said hand operated actuator, said hand operated actuator comprised of a pair of spaced thrust collars that are connected by means of a pair of pivotally supported brake shoes and a pair of eccentrically mounted cam discs, said pair of eccentrically mounted cam discs each supported in a brake shoe, one thrust collar affixed to a stationary element and providing the pivotal mounting for said pair of eccentrically mounted cam discs and the other collar affixed to said rod and providing the pivotal mounting for said pair of brake shoes that supports said pair of eccentrically mounted cam discs, a handle connected to both eccentrically mounted cam discs to rotate said cam discs to a plurality of predetermined positions, means to move said handle to a predetermined position to in turn actuate said device to a predetermined degree.

References Cited in the file of this patent

UNITED STATES PATENTS

| | | |
|---|---|---|
| 573,977 | Hubbard | Dec. 29, 1896 |
| 602,902 | Foster | Apr. 26, 1898 |
| 812,475 | Barber | Feb. 13, 1906 |
| 1,510,436 | Englesson | Sept. 30, 1924 |
| 1,832,075 | Wilson | Nov. 17, 1931 |
| 1,857,319 | Monroe | May 10, 1932 |
| 2,385,881 | Peterson | Oct. 2, 1945 |
| 2,503,907 | Hefler | Apr. 11, 1950 |
| 2,582,559 | Pearson | Jan. 15, 1952 |
| 2,612,229 | Tornes et al. | Sept. 30, 1952 |

FOREIGN PATENTS

| | | |
|---|---|---|
| 343,777 | Great Britain | Feb. 26, 1931 |
| 365,853 | Great Britain | Mar. 31, 1932 |
| 58,866 | Norway | Jan. 17, 1938 |